(12) United States Patent
Chidsey et al.

(10) Patent No.: US 8,221,599 B2
(45) Date of Patent: Jul. 17, 2012

(54) CORROSION-RESISTANT ANODES, DEVICES INCLUDING THE ANODES, AND METHODS OF USING THE ANODES

(75) Inventors: Christopher E. D. Chidsey, San Francisco, CA (US); Paul C. McIntyre, Sunnyvale, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 201 days.

(21) Appl. No.: 12/753,234

(22) Filed: Apr. 2, 2010

(65) Prior Publication Data

US 2010/0252441 A1    Oct. 7, 2010

Related U.S. Application Data

(60) Provisional application No. 61/166,701, filed on Apr. 3, 2009.

(51) Int. Cl.
*C25B 11/06* (2006.01)
*C25B 11/08* (2006.01)
*C25B 11/10* (2006.01)
*C25B 11/16* (2006.01)

(52) U.S. Cl. ............ 204/284; 204/290.01; 204/290.12; 204/290.14; 205/620; 205/628; 205/630; 205/633; 205/455

(58) Field of Classification Search ............ 204/284, 204/290.01, 290.12, 290.14; 205/620, 628, 205/630, 633, 455
See application file for complete search history.

(56) References Cited

U.S. PATENT DOCUMENTS

| | | | | | |
|---|---|---|---|---|---|
| 3,775,284 | A | * | 11/1973 | Bennett et al. ................ 205/261 |
| 4,469,581 | A | * | 9/1984 | Asano et al. ............. 204/290.09 |
| 4,481,097 | A | * | 11/1984 | Asano et al. ............. 204/290.09 |
| 4,484,999 | A | * | 11/1984 | Asano et al. ............. 204/290.09 |
| 4,554,176 | A | * | 11/1985 | Asano et al. ................. 427/125 |
| 4,584,084 | A | * | 4/1986 | Asano et al. ............. 204/290.09 |
| 5,593,556 | A | * | 1/1997 | Kumagai et al. ......... 204/290.08 |
| 5,900,127 | A | * | 5/1999 | Iida et al. ................. 204/290.08 |
| 2004/0185323 | A1 | | 9/2004 | Fowler et al. |
| 2006/0066203 | A1 | * | 3/2006 | Uno et al. ..................... 313/311 |
| 2007/0251829 | A1 | | 11/2007 | Marsh |
| 2009/0061267 | A1 | | 3/2009 | Monzyk et al. |

OTHER PUBLICATIONS

International Search Report and Written Opinion, dated Nov. 26, 2010.

* cited by examiner

*Primary Examiner* — Bruce Bell
(74) *Attorney, Agent, or Firm* — Thomas, Kayden, Horstemeyer & Risley, LLP

(57) ABSTRACT

Embodiments of the present disclosure include an anode, devices and systems including the anode (e.g., electrochemical devices and photo-electrochemical devices), methods of using the anode, methods of producing $H_2$ and $O_2$ from $H_2O$, $Cl_2$, oxidixed organic feedstocks, oxidation for the detection and quantification of chemical species, and the like.

43 Claims, 6 Drawing Sheets

US 8,221,599 B2

CORROSION-RESISTANT ANODES, DEVICES INCLUDING THE ANODES, AND METHODS OF USING THE ANODES

CROSS-REFERENCE TO RELATED APPLICATION

This application claims priority to U.S. provisional applications entitled, "Nanostructured Corrosion-Resistant Anode for Oxidation of Water," having Ser. No. 61/166,701 filed on Apr. 3, 2009, which is entirely incorporated herein by reference.

BACKGROUND

Efficient electrolysis or photolysis of water, which is of interest for the generation of hydrogen as well as other for other uses, requires stable, corrosion resistant, and catalytic anode materials. Water or hydroxide anion must be oxidized through a series of steps to produce molecular oxygen or reactive oxygen intermediates. Efficient oxidation of water requires a durable material that is not susceptible to oxidative corrosion in water that produces an electrically insulating and/or unreactive surface. The oxidation of other chemical species, including chloride anion, various organic feedstock such are olefins, aromatic and alkylated aromatic compounds, also benefit from durable anodes. The detection and quantification of many chemical species by oxidation also benefit from durable anodes. In addition, anode materials with certain electronic properties are better than other materials for the oxidation of water or these other uses. Thus, there is a need for anodes for oxidation of water and other chemical species that overcome deficiencies with current technologies. This restricts the practical choices of the materials and anode structures that can be used.

SUMMARY

Embodiments of the present disclosure provide for an anode, methods of using the anode, methods of producing $H_2$ and $O_2$ from $H_2O$, $Cl_2$, oxidized organic feedstocks, oxidation for the detection and quantification of chemical species, and the like.

An embodiment of the present disclosure includes an anode, among others, a catalyst layer, a corrosion-inhibiting barrier layer, and a conductive base anode, wherein the oxidation-resistant barrier layer is disposed on the conductive base anode and the catalyst layer is disposed on the corrosion-inhibiting barrier layer, wherein the corrosion-inhibiting barrier layer is disposed between the catalyst layer and the conductive base anode, and wherein the corrosion-inhibiting barrier layer is a pin-hole-free layer.

An embodiment of the present disclosure includes an anode, among others, an oxidation-resistant catalyst layer disposed on a conductive base anode, and wherein the corrosion-inhibiting catalyst layer is a pin-hole-free layer, wherein the catalyst layer is a material selected from the group consisting of: $TiO_2$, $IrO_2$, $RuO_2$, $SnO_2$, $CoO_x$, $MnO_x$, Ir, and Ru, where x is between 0.5 and 2 wherein the catalyst layer is about 1-10 nm thick, and wherein the catalyst layer has a substantially uniform thickness.

An embodiment of the present disclosure includes producing molecular $O_2$, among others, including: exposing water to an anode such as that described herein, oxidizing the water at the catalyst layer surface; and forming molecular $O_2$.

An embodiment of the present disclosure includes producing molecular $Cl_2$, among others, including: exposing chloride ions in an electrochemical solution to an anode such as that described herein, oxidizing the chloride ions at the catalyst layer surface; and forming molecular $Cl_2$.

An embodiment of the present disclosure includes a method, among others, including: exposing the compounds selected from the group consisting of: an olefin, an aromatic or alkylated aromatic organic feedstocks in an electrochemical solution, to an anode such as those described herein, oxidizing the compounds at the catalyst layer surface; and forming oxidized organic reaction products.

An embodiment of the present disclosure includes a method, among others, including: exposing a compound(s) to an anode such as those described herein, oxidizing the compound(s) at the catalyst layer surface; forming an oxidized compound(s); and determining the identity of the compounds or the quantity of the compounds.

These embodiments, uses of these embodiments, and other uses, features and advantages of the present disclosure, will become more apparent to those of ordinary skill in the relevant art when the following detailed description of the preferred embodiments is read in conjunction with the appended figures.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
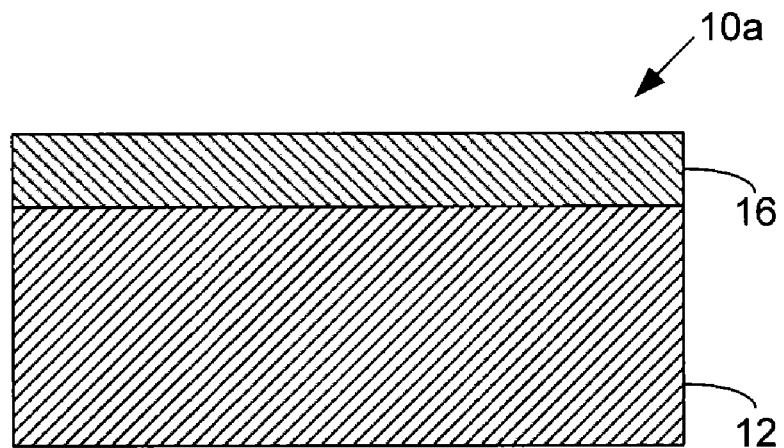
FIG. 1 illustrates a cross-section of an embodiment of an anode of the present disclosure.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, electrochemistry, materials science, and the like, which are within the skill of the art. Such techniques are explained fully in the literature.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

As used herein, the following terms have the meanings ascribed to them unless specified otherwise. In this disclosure, "comprises," "comprising," "containing" and "having" and the like can have the meaning ascribed to them in U.S. patent law and can mean "includes," "including," and the like; "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. patent law and the term is open-ended, allowing for the presence of more than that which is recited so long as basic or novel characteristics of that which is recited is not changed by the presence of more than that which is recited, but excludes prior art embodiments.

General Discussion

Embodiments of the present disclosure include anodes, devices and systems including the anode (e.g., electrochemical devices and photo-electrochemical devices), methods of using the anode, methods of producing $H_2$ and $O_2$ from $H_2O$, $Cl_2$, oxidized organic feedstocks, oxidation for the detection and quantification of chemical species, and the like. An embodiment of the present disclosure includes an anode that is corrosion resistant, has catalytic surface sites for oxidation reactions, and can have large (e.g., >1 mA/cm² oxidation current density) oxidation rates of water and other chemical species at modest over-potentials (e.g., <400 mV). The anode can be used in a device or in a system that can be used for the generation of hydrogen or other reduced molecular fuels, oxidation of chlorides to chlorine, oxidation of aromatics to produce monomers for polymer synthesis and other uses, oxidation of organic carbon for total organic carbon chemical analysis and other detection and quantification strategies, reclamation of metals from aqueous solution by electrowinning, disinfection of drinking water, or the destruction of organic pollutants in water by reactive oxygen species. In particular, embodiments of the anode can be used in devices or systems to conduct electrolysis and photoelectrolysis to produce $H_2$ and/or $O_2$.

An embodiment of the present disclosure provides an anode that is not susceptible to oxidative corrosion in water or other compounds of typical solutions. In addition, the anode provides a surface that has a high density of sites at which oxidation reaction can occur in a facile manner. Also, because each species to be oxidized must lose low energy electron(s) to the anode in order to contribute to the formation of the oxidized product, the anode provides holes (vacancies in the normally-occupied portion of anode's electron energy band structure) that can be readily transported from the bulk of the anode (base anode material) to the surface of the anode (catalytic metal or metal oxide surface layer). Therefore, the embodiments of the present disclosure provide both a corrosion-resistant layer protecting the base anode material, and this layer permits facile electronic transport from the electrochemical solution (e.g., water) to the base anode material.

In an embodiment shown in FIG. 1, the anode 10a includes a catalyst layer 16 disposed (e.g., in direct contact with) on a conductive substrate 12 (also referred to as "conductive base anode 12"). The catalyst layer 16 can, in this embodiment, function as a corrosion-inhibiting catalyst layer. It should be noted that the catalyst layer 16 can be a metal catalyst layer or a metal oxide catalyst layer, both of which are disclosed in more detail below.

Figure 2:
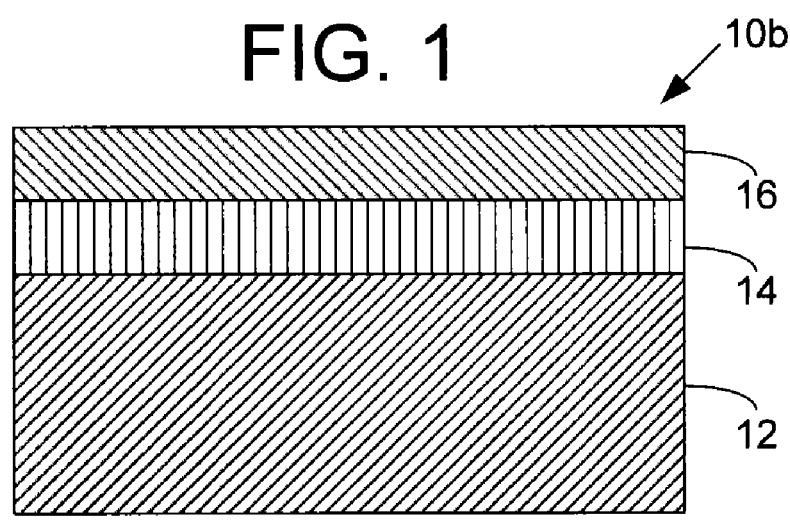
FIG. 2 illustrates a cross-section of another embodiment of an anode of the present disclosure.

In another embodiment shown in FIG. 2, the anode 10b includes a catalyst layer 16, a corrosion inhibiting barrier layer 14 that permits facile electron transport, and a conductive base anode 12. In this embodiment, the barrier layer 14 is a corrosion inhibiting barrier layer, which allows the catalyst layer to be either a substantially uniform-thickness layer or a layer having islands of material. The corrosion inhibiting barrier layer 14 is disposed on the conductive substrate 12 and the catalyst layer 16 is disposed on the corrosion inhibiting barrier layer 14 so that the catalyst layer 16 is on the top, the corrosion inhibiting barrier layer 14 is in the middle, and the conductive substrate 12 is on the bottom.

The catalyst layer 16 can function as a catalyst for electrochemical reaction of species in the electrochemical solution surrounding the anode 10a or 10b, for example in the oxidation of water to form $H_2$ and $O_2$. The catalyst layer 16 in each of the embodiments shown in FIGS. 1 and 2 can be made of a material such as $TiO_2$, $IrO_2$, $RuO_2$, $SnO_2$, $CoO_x$, $MnO_x$, Ir, and Ru, or a combination thereof, where x is between 0.5 and 2. In an embodiment, $IrO_2$ is used as the catalyst layer 16. An advantage of using a very thin catalyst layer 16 is that the amount of the metal catalyst, which often contains precious metals, is much less (e.g., 1000× less) than that used in other anodes for catalyzed oxidation. In an embodiment, the catalyst layer 16 is a pinhole-free layer and has a substantially (e.g., <1 nm standard deviation) uniform thickness. For electrochemical (dark) oxidation, the thickness of the substantially uniform catalyst layer 16 can be in the range of about 1 nm to 1 μm. It should be noted that the thickness of the substantially uniform catalyst layer 16 noted above is an average thickness since the thickness can vary some across the surface of a substantially uniform catalyst layer 16. In an embodiment where the anode is to be used in photoelectrochemical oxidation, the catalyst layer 16 should be thinner than about 50 nm to prevent absorption of light (which enters from the catalyst layer (top side)) by the underlying base anode material. The catalyst layer 16 can be formed using techniques such as atomic layer deposition (ALD), chemical vapor deposition (CVD), physical vapor deposition (PVD), or chemical solution deposition (CSD).

In an embodiment, ALD is used to form the catalyst layer 16 to control layer thickness and uniformity. In general, ALD includes pulsing precursors in a serial manner and chemisorption of the precursors on the surface to form a pinhole-free catalyst layer that protects the anode from corrosion during oxidation of water. In an embodiment, alkylamide-derived precursors to form the materials noted above and water vapor in a temperature range of about 100° C. to 400° C. can be used to form the catalyst layer 16 by ALD. ALD is a well known technique and additional details are not described herein, but can be found in the following references: *Handbook of Crystal Growth* (North-Holland, N.Y., 1994) vol. 3, c. 14 pp. 605-663; *J. Phys. Chem.* 100, 13121 (1996), and *J. Korean Phys. Soc.* 48, 5 (2006), each of which are incorporated herein by reference.

In other embodiments, the catalyst layer 16 in FIGS. 1 and 2 can be made of a metal, such as Ir, Ru, Ag, Ni, or Mn, or alloys thereof, that will oxidize in situ during operation of the anode at highly oxidative electrochemical potentials (e.g., forming $IrO_2$, $RuO_2$, $Ag_2O$, NiO, $Mn_2O_3$, or mixtures thereof). Although the catalyst layer 16 is initially a metal catalyst layer, the metal is oxidized during operation to form a metal oxide catalyst layer. Thus, it is contemplated to be within the scope of the present disclosure that the catalyst layer 16 is initially a metal catalyst layer that is subsequently oxidized. These metal catalyst layers can deposited as either uniform-thickness or islanded thin films by methods such as ALD, CVD, and PVD.

As noted above, some embodiments include a corrosion inhibiting barrier layer 14. The corrosion inhibiting barrier layer 14, interposed between the surface catalyst layer (metal or metal oxide) and the underlying conductive base anode material, functions to protect the base anode from corrosion, but is thin enough that facile electron transport (e.g., by tunneling) can occur across it. In an embodiment, the corrosion inhibiting barrier layer 14 should not impart additional resistance greater than about $10 \Omega \cdot cm^2$ to the interfacial surface of the anode, compared to its resistance to the interfacial surface of the anode without the barrier layer. In an embodiment, the interfacial areal resistance of the corrosion-resistant barrier layer is less than 10 ohms centimeter squared ($\Omega cm^2$). In an embodiment, the interfacial areal conductivity of the corrosion-resistant barrier layer is greater than 0.10 siemens per centimeter squared ($S/cm^2$). The corrosion inhibiting barrier layer 14 shown in FIG. 2 can be made of a material such as $SiO_2$, $Al_2O_3$, $Si_3N_4$, $TiO_2$, $Mn_2O_3$, or a combination thereof. The thickness of the barrier layer 14 can be about 1 to 10 nm. In an embodiment, the thickness of each of the catalyst layer 16 and the barrier layer 14 are each about 2 nm. The corrosion inhibiting barrier layer 14 can be formed intentionally by depositing the corrosion inhibiting barrier layer 14 or it can be formed on the surface of the conductive base anode 12 through other processes prior to forming the catalyst layer 16. The corrosion inhibiting barrier layer 14 can be formed using techniques such as atomic layer deposition (ALD), chemical vapor deposition (CVD), physical vapor deposition (PVD), chemical solution deposition (CSD), and controlled oxidation of the substrate. The corrosion inhibiting barrier layer 14 should be pin-hole-free in order to inhibit corrosion of the underlying base anode material 12.

In some embodiments, a catalyst layer of substantially uniform thickness may not be desirable. For example, in systems in which the rate of oxidation is increased by the simultaneous presence of aqueous solution, catalyst layer 16 material and the corrosion inhibiting barrier layer 14 material, on the surface, constituting a triple-phase boundary, a porous or islanded catalyst layer 16 deposited onto a continuous corrosion inhibiting barrier layer 14 would be most desirable. The triple-phase boundary is a well known feature of heterogeneous catalysis of chemical and electrochemical reactions. Additional details about it are not described herein, but can be found in the following references: *J. Electrochem. Soc.* 138, 1867 (1991); *Solid State Ionics* 92, 65 (1996); and *Annu. Rev. Mater. Res*, 33, 361 (2003), each of which are incorporated herein by reference. Such islanded films can be prepared by controlling the catalyst layer 16 deposition conditions in ALD, CVD or PVD, or by post-deposition annealing of substantially uniform catalyst layers to cause islanding (partial dewetting) driven by surface energy differences between the catalyst and barrier layers.

In an embodiment, the conductive base anode 12 in each of the embodiments shown in FIGS. 1 and 2 can be a thin film that can be disposed on a conductive structure (e.g., steel) or an insulating structure (e.g., an insulting polymer). The thin film can be a material such as Si, Ge, TiN, Al, Ir, Pd, Pt, Ni, Ru, Ti, Ta, GaP, InP, AlP, GaAs, oxides of Ir, Pd, Pt, Ni, metal silicides, metal germanides, doped composites or alloys of each, or a combination thereof. The most commercially available base anode materials are Si, Al and Ti. If the conductive base anode 12 is a doped semiconductor, the conductive base anode 12 can be p-type (e.g., for dark electrolysis) or n-type (e.g., for photoelectroylsis). The base anode can vary in thickness depending upon the specific embodiment. It could be a thin film greater than about 10 nm in thickness, or it could be a bulk material of macroscopic thickness (but typically <1 cm in thickness).

In another embodiment, the conductive substrate 12 (also referred to as conductive base anode) in each of the embodiments shown in FIGS. 1 and 2 can be a bulk single crystal or a polycrystalline material. In an embodiment, the conductive base anode 12 can be a semiconductor material (e.g., used in photoelectrolysis or electrolysis of water) (e.g., Si, Ge, GaAs, GaP, InP, AlP or combinations thereof or a metallic conductive material (e.g., Ti, Al, TiN, Ir, Pd, Pt, Ni, Ru, Ta, oxides of Ir, Pd, Pt, Ni, metal silicides, metal germanides, or combinations thereof (e.g., used in the electrolysis of water). The most commercially available base anode materials are Si, Al and Ti. A doped semiconductor base anode 12 can be p-type (e.g., for dark electrolysis, where the thermally generated population of holes is used to accept electrons from water during its oxidation on the anode surface) or n-type (e.g., for photoelectrolysis, where photogenerated holes near the base anode surface are filled, but photogenerated electrons must also traverse the base anode thickness to drive reduction of hydrogen or other species at the cathode). In one embodiment, the semiconducting base anode is doped to produce a pn junction (e.g., p-type region on the surface of the anode (under the corrosion inhibiting barrier layer), in contact with the corrosion inhibiting barrier layer, and n-type semiconductor underlying the p-type region). This pn junction produces a built-in potential that will encourage separation of photogenerated holes to the anode surface and photogenerated electrons to the cathode, respectively. The dimensions of the conductive base anode 12 can vary depending on the specific use of the corrosion-resistant anode 10a and 10b. Thin film conductive base anode layers (thicknesses of 100's of nm to 10's of μm, depending on the photon absorption length in the semiconductor material used) on large-area and inexpensive substrates may be of interest for collection of sunlight for photoelectrolysis of water. Relatively thick base anodes optimized for very low electrical resistivity may be of interest for dark electrolysis in electrochemical cells engineered for efficient mass, heat, and electron transport.

In an embodiment, the conductive base anode 12 can be a porous structure. The porous structure has a much higher surface area (>10×) than that of a non-porous structure. The higher surface area can increase the number of available catalytic sites on the anode surface (e.g., more catalyst layer surface area per nominal surface area of the cell in which the anode is used) for reaction (e.g., oxidation of water). In an embodiment, the pore channels are on the 0.1-100 μm scale in length and about 5 nm to 1 μm in diameter. The pore channels can be coated by a barrier layer of substantially uniform thickness by thermal or plasma-assisted oxidation and/or nitridation, or by ALD, CVD, or PVD. The pore channels, possibly coated by a corrosion-inhibiting barrier layer, can be coated with a catalyst layer of substantially uniform thickness (if continuous) or island coverage (if islanded) by ALD, CVD or PVD. The length:diameter aspect ratio of the coated pore channels can be in the range 2:1 to 20000:1.

In this embodiment, the conductive base anode 12 can be composed of the same materials described in reference to FIGS. 1 and 2 (conductive base anode 12). The catalyst layer and the corrosion-inhibiting barrier layer can be made of the same material as described in reference to FIGS. 1 and 2 (catalyst layer 16 and corrosion-inhibiting barrier layer 14).

The catalyst layer and/or the corrosion-inhibiting barrier layer can be disposed on the walls, bottom, and top, of the pore channels to form the coated pore channels. In particular, the catalyst layer and/or the barrier layer can be conformally coated (coated with substantially uniform thickness or uniform island coverage over all parts of the pore channel, with effective thickness variation <1 nm) on the walls, bottom, and top, of the pore channels to form the coated pore channels. In an embodiment, the catalyst layer and/or the barrier layer form a pinhole-free layer(s). In embodiments including both the catalyst layer and the barrier layer, the barrier layer is coated on the porous structure and the catalyst layer is disposed on the barrier layer.

Figure 3:
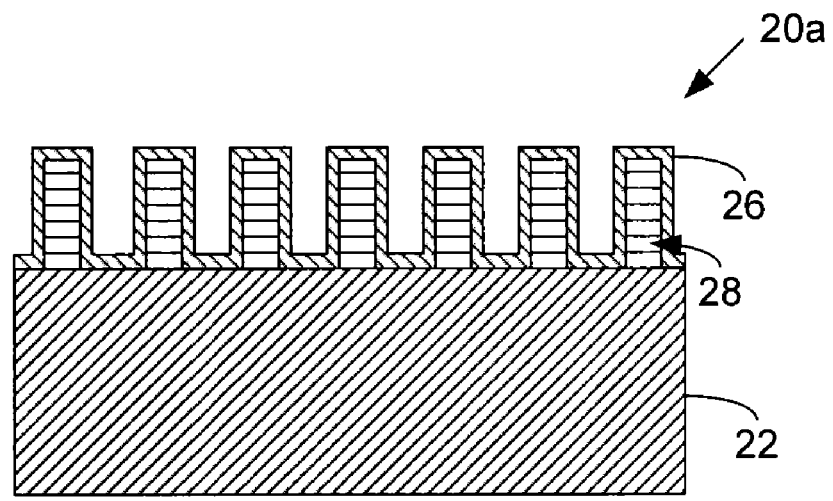
FIG. 3 illustrates a cross-section of another embodiment of an anode of the present disclosure.
Figure 4:
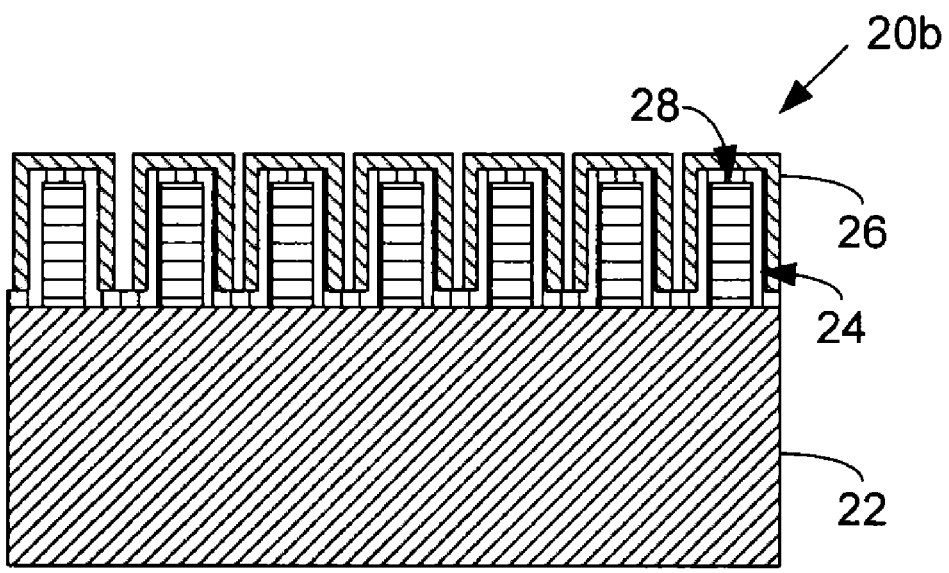
FIG. 4 illustrates a cross-section of another embodiment of an anode of the present disclosure.

FIGS. 3 and 4 illustrate that the anode 20a or 20b can include a conductive base anode 22 that includes a layer of conductive nanowires 28. The conductive base anode 22 can be composed of the same materials described in reference to FIGS. 1 and 2 (conductive base anode 12). The catalyst layer 26 and the corrosion-inhibiting barrier layer 24 can be made of the same materials described in reference to FIGS. 1 and 2 (catalyst layer 16 and corrosion-inhibiting barrier layer 14).

The layer of nanowires 28 can be formed from the conductive substrate 22 material (e.g., anisotropically etched silicon) or can be disposed (e.g., grown or directly deposited on) on the conductive base anode 22. As a result, the nanowires can be made of the same material as the conductive base anode 22 or can be made of a different conductive material 22. The set of possible nanowire materials of interest for this structure includes Si, GaAs, Ge, and Ti and combinations thereof. The layer of conductive nanowires 28 has a nanowire areal density of about 0.1 to 5000 $\mu m^{-2}$, 0.1 to 1000 $\mu m^{-2}$, 0.1 to 500 $\mu m^{-2}$, or about 0.1 to 100 $\mu m^{-2}$. The nanowires can have a diameter of about 10 nm to 1 μm and a height (length) of about 100 nm to 100 μm. It should be noted that each nanowire in the layer of conductive nanowires 28 may not have the exact same diameter or length but that each nanowire can vary within the diameters and lengths noted above. If the nanowires are semiconducting (e.g., Si), the nanowires can be doped to control their initial (uncoated) electronic conductivity either by dopant atom incorporation during nanowire growth or by annealing the nanowires in a dopant gas-containing atmosphere after their growth. The catalyst layer and/or the corrosion-inhibiting barrier layer can be disposed on the sides and top of the nanowires and on the bottom between the nanowires to produce a surface that is catalytic for oxidation of species in the aqueous electrolyte solution. In particular, the catalyst layer and/or the corrosion-inhibiting barrier layer can be conformally coated on the sides and top of the nanowires and on the bottom between the nanowires to form nanowires with catalytically active surface sites and to provide corrosion protection to the nanowire-decorated anode. In an embodiment, the catalyst layer and/or the corrosion-inhibiting barrier layer form a pinhole-free layer(s). In embodiments including both the catalyst layer and the corrosion-inhibiting barrier layer, the corrosion-inhibiting barrier layer is coated on the nanowires and the catalyst layer is disposed on the corrosion-inhibiting barrier layer.

Figure 5:
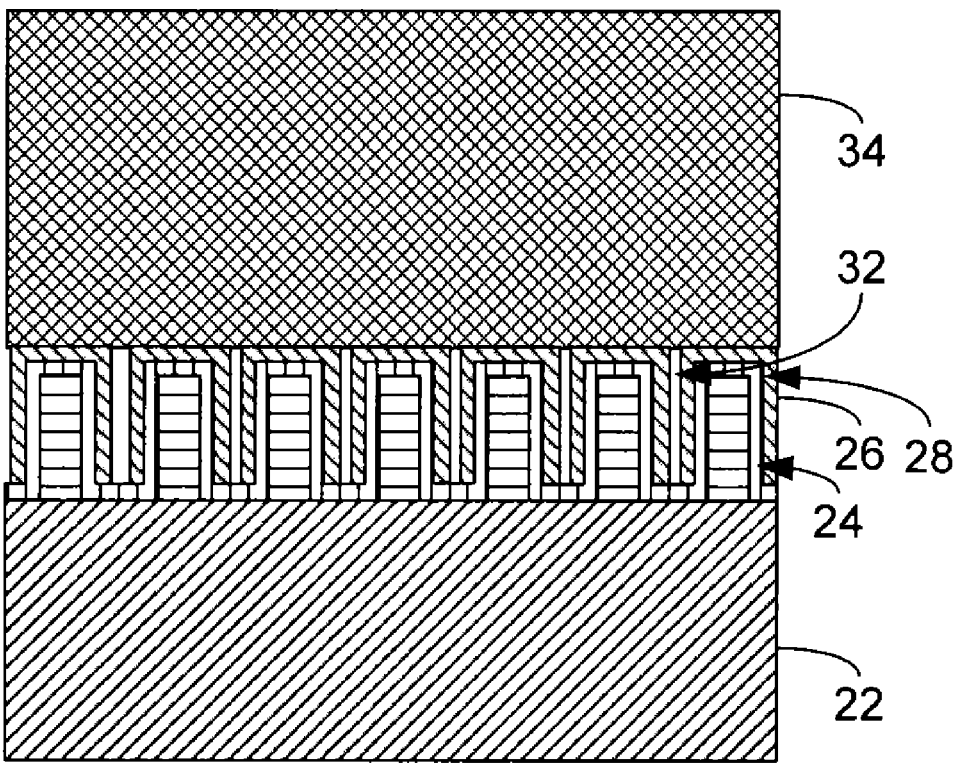
FIG. 5 illustrates a cross-section of another embodiment of an anode of the present disclosure.

In another embodiment that is shown in FIG. 5, the conductive substrate includes a channel 32 (e.g., a microfluidic channel) to flow a fluid. A layer of conducting metallic or doped semiconducting nanowires 28 can be formed in the channel 32, where the catalyst layer 26, and the corrosion-inhibiting barrier layer 28 can be disposed on the nanowires. In an embodiment, a selective ion membrane 34 can be disposed on a portion of (or on top of) the channel 32 and the coated layer of conductive nanowires such that the fluid is able to flow through the channel 32 and interact with the coated layer of nanowires. The selective ion membrane 34 can be made of a material such as Nafion®. The selective ion membrane 34 can have a thickness of about 1 to 100 μm.

The conductive substrate 22 can be the same as those described in reference to FIGS. 1 and 2 (conductive base anode 12). The catalyst layer 26, the corrosion-inhibiting barrier layer, and the catalyst layer can be made of the same material as described in reference to FIGS. 1 and 2 (catalyst layer 16 and corrosion-inhibiting barrier layer).

In an embodiment, the fluid is water and aqueous $H^+$ is removed from the channel 32 through a $H^+$ permeable ion membrane (Nafion®) and electrons are removed through the conductive substrate 22, while water and $O_2$ are removed from the channel 32. The aqueous $H^+$ can be reduced at the cathode (not shown) to form $H_2$. Thus, this embodiment is able to produce $H_2$ and $O_2$.

As noted above, embodiments of the anode can be used in an electrolysis or photoelectrolysis device or system. In general, electrolysis or photoelectrolysis devices are well known in that they include a cathode, anode, and a fluid (e.g., electrolyte), where a current drives reactions at the cathode and anode. In photoelectrolysis the current is supplied by light (e.g., sunlight). In an embodiment, a structure such as a membrane can be used to divide the device into an area including the cathode and another area including the anode, where certain chemical species can pass through the membrane. In particular, the membrane can be an ion selective membrane such as Nafion®.

An embodiment of the present disclosure includes producing molecular $O_2$ using anodes described herein. In general, exposing water is introduced to an anode, where the water is oxidized to produce molecular $O_2$.

An embodiment of the present disclosure includes producing molecular $Cl_2$ using anodes described herein. In general, chloride ions in an electrochemical solution are introduced to an anode, wherein the chloride ions are oxidized at the catalyst layer surface to form molecular $Cl_2$.

An embodiment of the present disclosure includes forming oxidized organic reaction products from organic compounds in an electrochemical solution such as an olefin, an aromatic or an alkylated aromatic organic feedstock, or a combination thereof. The organic compounds are exposed to the anode, wherein the organic compounds are oxidized to oxidized organic compounds. The olefin can include compounds such as, but not limited to, ethylene, propylene, styrene, and a combination thereof. The aromatic or alkylated aromatic organic feedstocks can include compounds such as, but not limited to, benzene, toluene, any of the xylenes, cumene, durene, and a combination thereof.

An embodiment of the present disclosure includes determining the identity of a compound(s) or the quantity of a compound(s). The compounds are exposed to an anode, where the compounds are oxidized. Reactants consumed and products produced during these electrochemical and photo-electrochemical reactions can be determined by measurement of the characteristic potentials at which current is produced, the magnitude of the current, and by chemical analysis of the electrochemical solution before and after oxidation. Chemical analysis methods include conductivity, acid or base titration, atomic absorption spectroscopy, inductively-coupled plasma mass spectrometry, other forms of spectroscopic analysis and precipitation methods.

EXAMPLE

Now having described the embodiments of the present disclosure, in general, the following example describes some additional embodiments of the present disclosure. While embodiments of present disclosure are described in connection with the example and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

Figure 6:
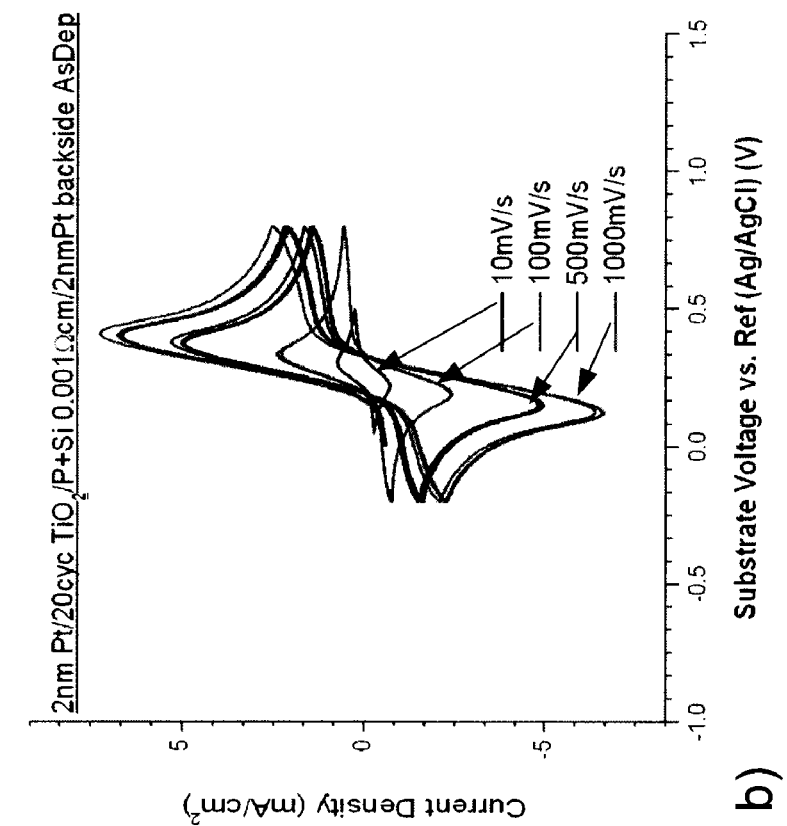
FIG. 6 illustrates a cyclic voltammetry trace for [Fe(CN)$_6$]$^{3-}$/[Fe(CN)$_6$]$^{4-}$ electrolyte in contact with an ALD-TiO$_2$ (2 nm)/p-Si anode and a 2 nm Pt/3 nm TiO$_2$/p-Si nanocomposite anode.
Figure 6:
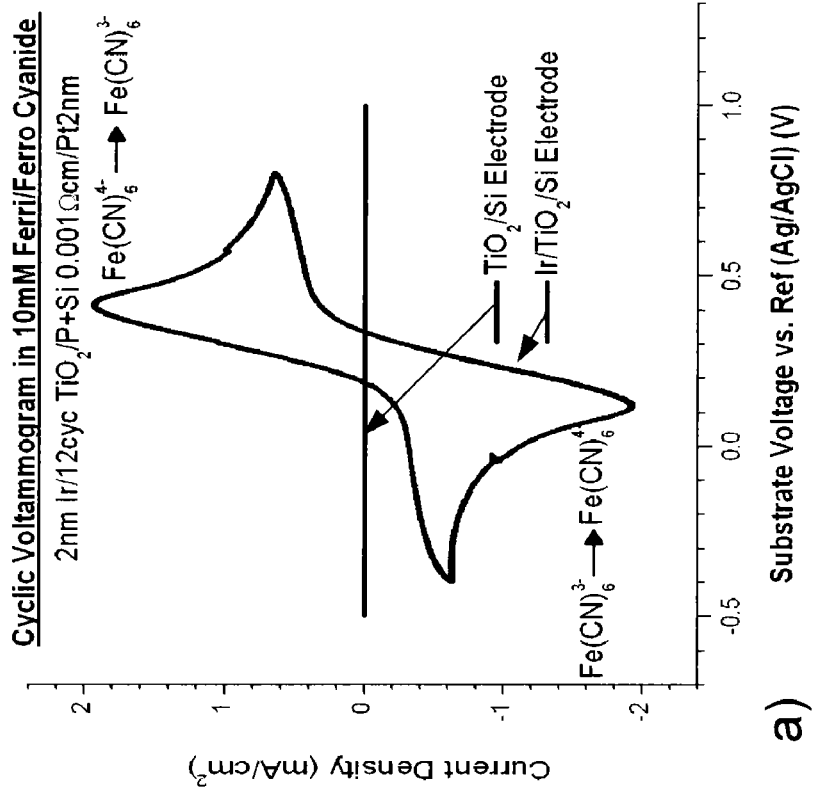

Embodiments of the present disclosure have focused on structures that combine the corrosion resistance and catalytic surface sites that are possessed by metal oxides with the outstanding electronic carrier transport and photovoltaic characteristics of Si semiconducting crystals. The composite anode includes a highly conductive, doped Si substrate on which a several nanometer-thick metal oxide layer is deposited by ALD to produce a dense, pin-hole-free coating of uniform thickness. The conductive material beneath this protective oxide can be either a bulk Si single crystal or a polycrystalline film (e.g., poly-Si) on a less expensive substrate. Some results, which have employed a doped Si single crystal substrate, show that electron transport across the anode/water interface can be greatly enhanced by coating the ALD metal oxide (e.g., $TiO_2$) with an ultra-thin (nm thickness) Pt or Ir layer. This is illustrated in FIG. 6, which shows cyclic voltammetry results obtained from $TiO_2$/p-type Si and Ir/$TiO_2$/p-type Si anodes, tested in the presence of the $[Fe(CN)_6]^{3-}$/$[Fe(CN)_6]^{4-}$ redox pair. Minimal redox current flow across the water/anode interface is observed without a 2 nm thickness Ir surface coating; however, a nearly ideal hysteretic cyclic voltammogram is measured with the Ir present.

Figure 7:
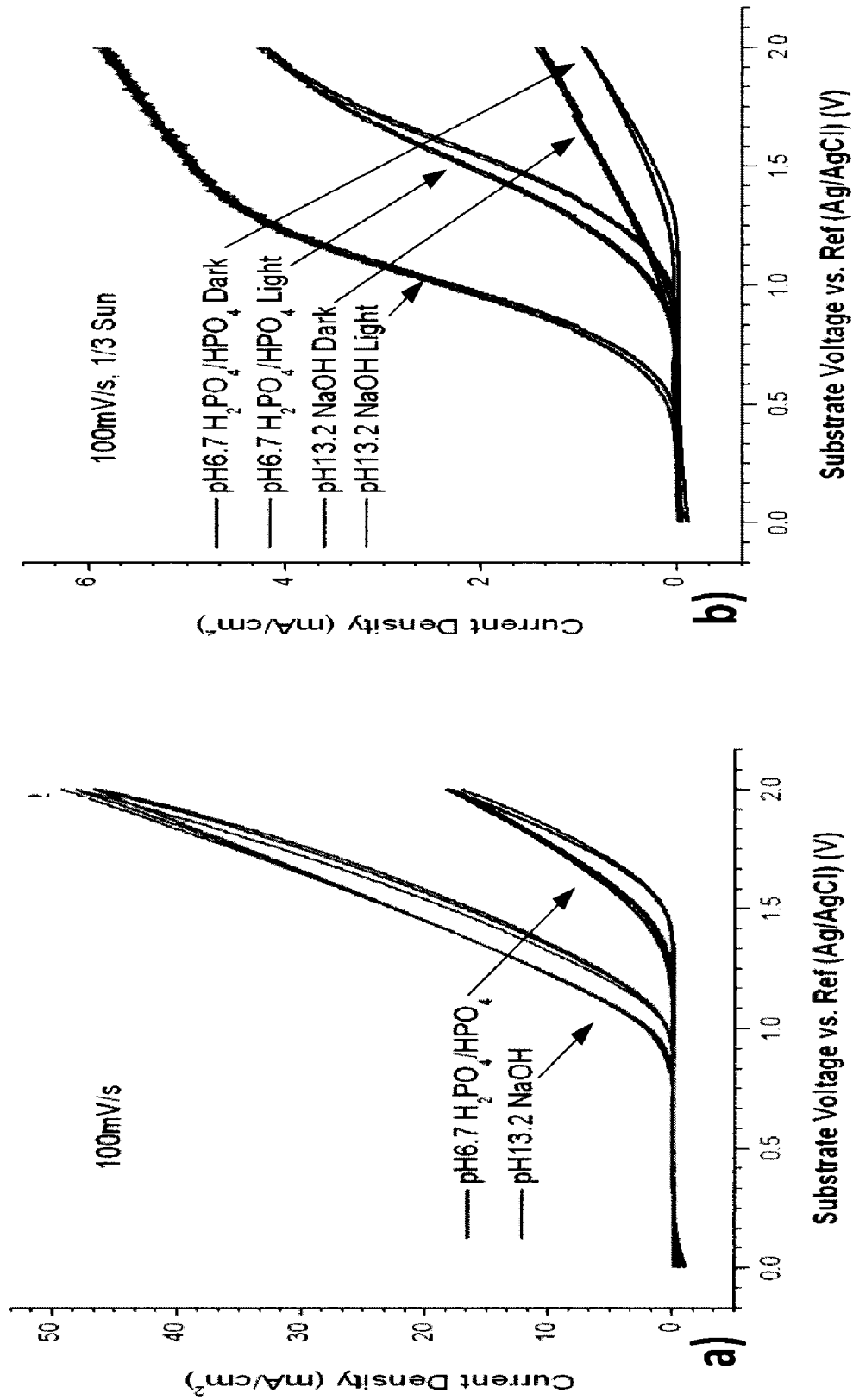
FIG. 7 illustrates a) electrolysis (p-type Si base anode with 0.001 Ωcm resistivity) and b) photolysis (n-type Si base anode with 0.1 Ωcm resistivity) current versus applied bias for a 2 nm Pt/3 nm TiO$_2$ layers.

Preliminary cyclic voltammetry data obtained during water electrolysis from a 2 nm Pt/3 nm ALD-$TiO_2$/p-Si anode at two different solution pH values are shown in FIG. 7. The plot in FIG. 7a) is consistent with over-potentials of 600-700 mV for pH 6.7 and pH 13.2 electrolytes. Although larger than the over-potentials for state-of-the-art dimensionally-stable anodes (DSA's) for this reaction (J. Electrochem. Soc. Vol. 150, D41-D45 (2003) and J. Appl. Electrochem. Vol 21, 335 (1991), each of which are incorporated herein by reference), these initial results show the relevance of ALD-grown nanocomposite anodes with ultra-thin noble metal catalyst layers for electrolytic oxidation of water. Data illustrated in FIG. 7b), collected during illumination in a simulated solar light source at a flux estimated at ~⅓ sun, show reduced over-potentials for water oxidation compared to the electrolysis data, as a result of the photogeneration of electron-hole pairs in the Si substrate.

Figure 8:
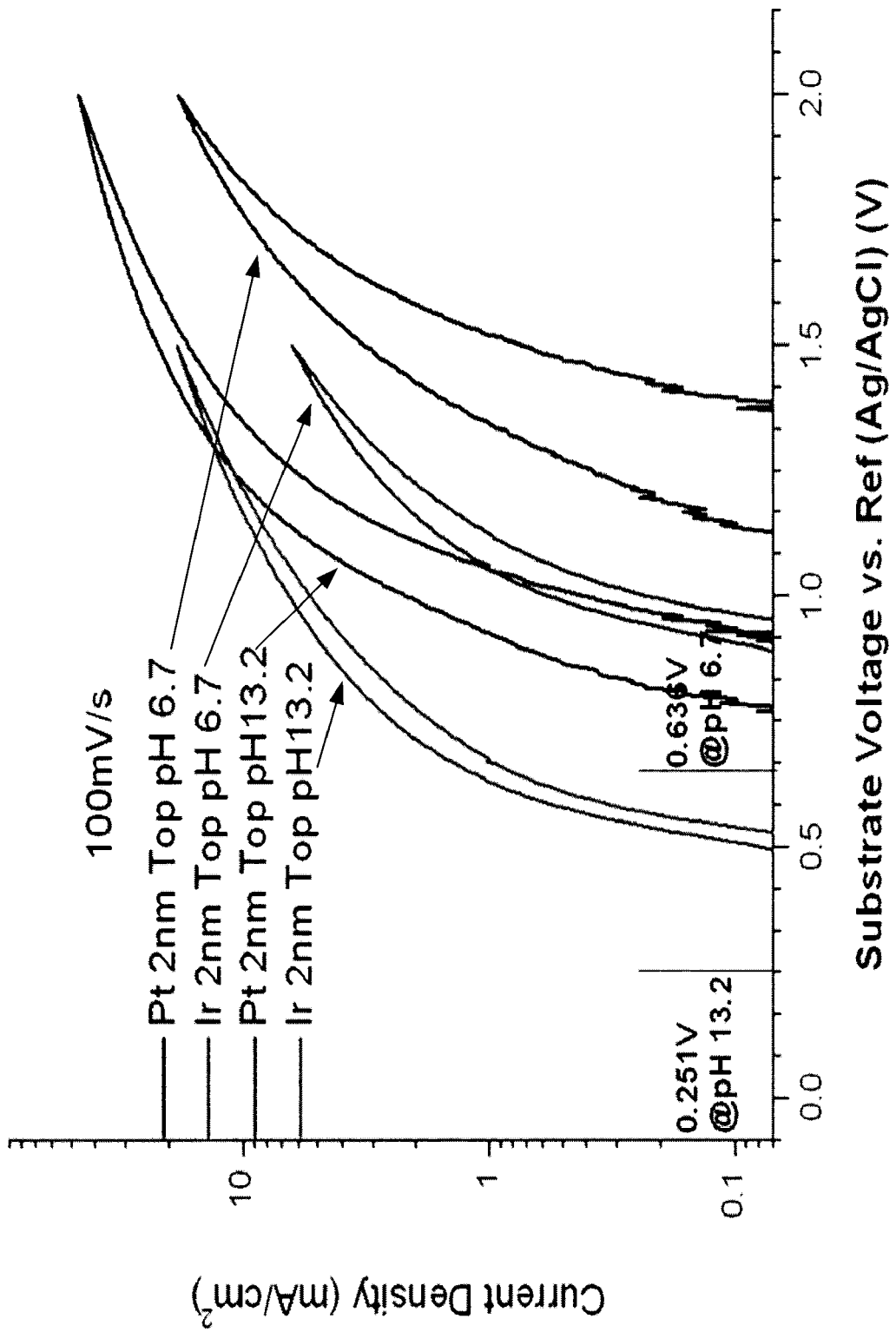
FIG. 8 illustrates a semilog plot of current density versus bias relative to Ag/AgCl reference for Ir and Pt catalyst layers on 3 nm ALD-TiO$_2$/p-Si anodes. Ideal O$_2$/H$_2$O redox potentials are shown along the horizontal axis.

Substituting an ultrathin Ir catalyst layer for the Pt layer in FIG. 7 produces a significant reduction in the over-potential required for facile water oxidation on otherwise identical nanocomposite anodes. As shown in FIG. 8, the over-potential for both solution pH values investigated is reduced to 350-400 mV for 1 mA/cm² of current. This value is close to the overpotential of DSA-like anodes, but is achieved with an approximately 1000-fold reduction in the quantity of noble metal used in the electrode surface coating.

Figure 9:
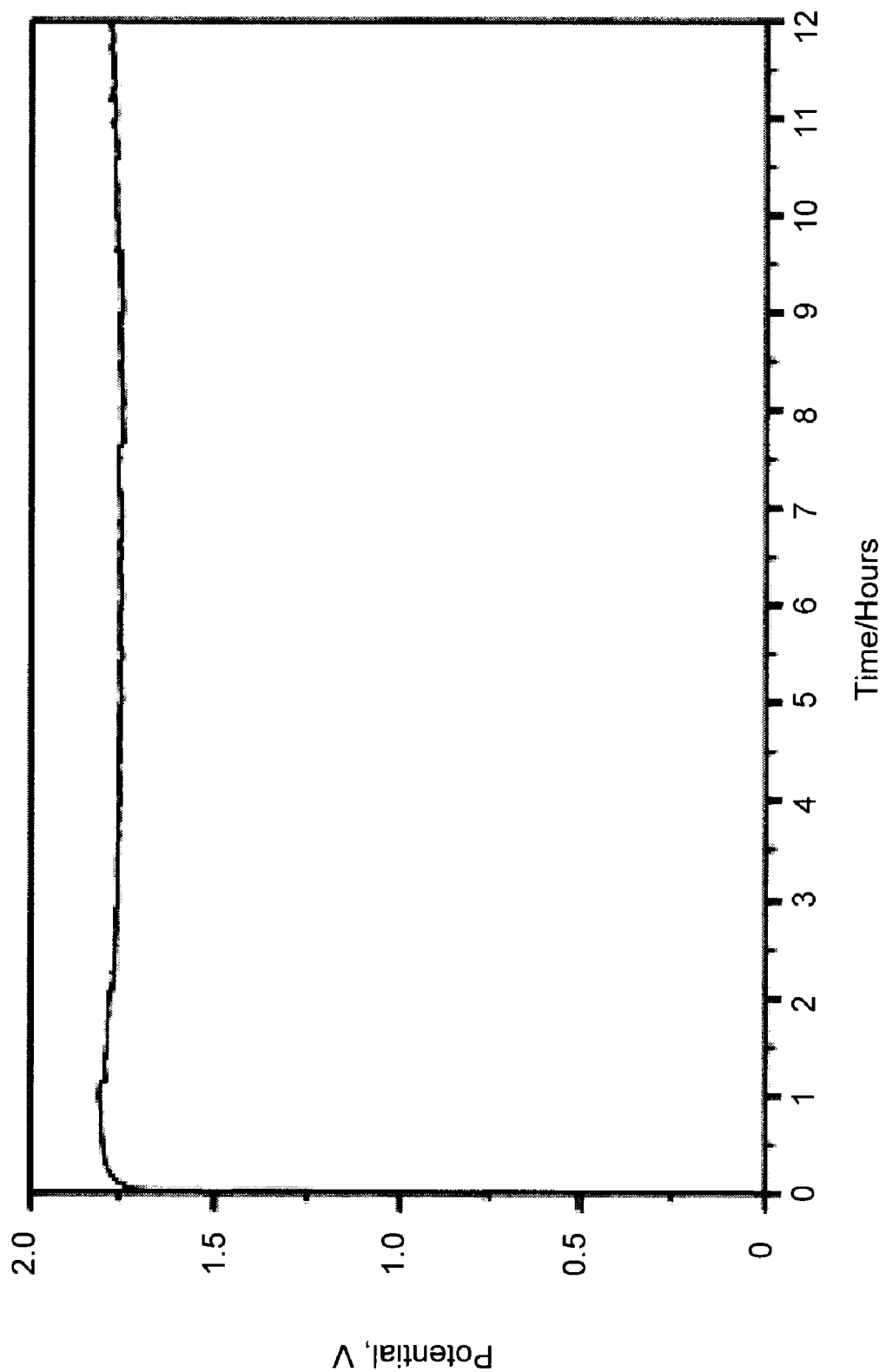
FIG. 9 illustrates an applied bias required to achieve constant current density of 5 mA/cm$^2$ for a Pt/TiO$_2$/p-type Si anode structure.

The TiO₂ barrier layer used in the structures we have studied to date imparts corrosion resistance to the Si substrate. Structures similar to those measured in FIGS. 7 and 8 but without the TiO₂ barrier layer, failed almost immediately under potentials required for water oxidation, as a result of oxidative corrosion of the underlying Si substrate. Constant current testing endurance data for a Pt/TiO₂/p-type Si anode are shown in FIG. 9. This anode structure, with evaporated 3 nm Pt and ALD-grown TiO₂ layer of 2 nm thickness, exhibits endurance of 12 h at constant applied bias for an oxidation current density of 5 mA/cm².

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The invention claimed is:

1. An anode comprising:
a catalyst layer, a corrosion-inhibiting barrier layer, and a conductive base anode, wherein the oxidation-resistant barrier layer is disposed on the conductive base anode and the catalyst layer is disposed on the corrosion-inhibiting barrier layer, wherein the corrosion-inhibiting barrier layer is disposed between the catalyst layer and the conductive base anode, wherein the corrosion-inhibiting barrier layer is a pin-hole-free layer, and wherein the corrosion-inhibiting barrier layer is less than 10 nm thick.

2. The anode of claim 1, wherein the interfacial areal resistance of the corrosion-resistant barrier layer is less than 10 ohms cm² or the interfacial areal conductivity of the corrosion-resistant barrier layer is greater than 0.1 siemens per cm².

3. The anode of claim 1, wherein the catalyst layer is about 1-10 nm thick and the barrier layer is about 1-10 nm thick.

4. The anode of claim 1, wherein the catalyst layer is a material selected from the group consisting of: TiO₂, IrO₂, RuO₂, SnO₂, CoO$_x$, MnO$_x$, Ir, Ru, and a combination thereof, where x is between 0.5 and 2.

5. The anode of claim 1, wherein the corrosion-inhibiting barrier layer is a material selected from the group consisting of: TiO₂, MnO$_x$, SiO₂, Al₂O₃, Si₃N₄, and a combination thereof.

6. The anode of claim 1, wherein the catalyst layer has a substantially uniform thickness.

7. The anode of claim 1, wherein the catalyst layer has a uniform thickness.

8. The anode of claim 7, wherein the structure underlying or supporting the anode mechanically is an insulating substrate.

9. The anode of claim 1, wherein the conductive base anode is a conductive film having a thickness of about 50 nm to 50 μm.

10. The anode of claim 9, wherein the conductive thin film base anode is disposed on a substrate of a different material.

11. The anode of claim 9, wherein the structure underlying or supporting the anode mechanically is a conductive substrate.

12. The anode of claim 1, wherein the conductive base anode is a bulk single crystal or a polycrystalline material.

13. The anode of claim 1, wherein the conductive base anode is made of a material selected from the group consisting of: Si, Ge, GaAs, GaP, InP, AlP, CdS, CdSe, and a combination thereof.

14. The anode of claim 1, wherein the conductive base anode is made of a material selected from the group consisting of: Ti, Al, TiN, Ir, Pd, Pt, Ni, Ru, Ta, oxides of Ir, Pd, Pt, Ni, metal silicides, metal germanides, and a combination thereof.

15. The anode of claim 1, wherein the conductive base anode is made of a semiconductor material.

16. The anode of claim 1, wherein the conductive base anode is made of a metallic conductive material.

17. The anode of claim 1, wherein the conductive base anode has a porous structure.

18. The anode of claim 1, wherein the conductive base anode has pore channels having a length:diameter aspect ratio of about 2:1 to 20000:1.

19. The anode of claim 1, wherein the conductive base anode has a layer of metallic conducting or doped semiconducting nanowires, wherein the corrosion-inhibiting barrier layer is disposed on the nanowires.

20. The anode of claim 19, wherein the catalyst layer is conformally coated on the nanowires.

21. The anode of claim 19, wherein the layer of nanowires has an areal density of about 0.1 to 5000 wires per μm².

22. The anode of claim 19, wherein the nanowire has a diameter of about 10 nm to 1 μm and a height (length) of about 100 nm to 100 μm.

23. The anode of claim 19, wherein the layer of conductive nanowires is made of the same material as the conductive substrate.

24. The anode of claim 19, wherein the layer of conductive nanowires is made of a different material as the conductive substrate.

25. An anode comprising:
an oxidation-resistant catalyst layer disposed on a conductive base anode, and wherein the corrosion-inhibiting catalyst layer is a pin-hole-free layer, wherein the catalyst layer is a material selected from the group consisting of: TiO₂, IrO₂, RuO₂, SnO₂m CoO$_x$, MnO$_x$, Ir, Ru, and a combination thereof, where x is between 0.5 and 2 wherein the catalyst layer is about 1-10 nm thick, and wherein the catalyst layer has a substantially uniform thickness.

26. The anode of claim 25, wherein the catalyst layer has a uniform thickness.

27. The anode of claim 25, wherein the conductive base anode is a conductive film having a thickness of about 50 nm to 50 μm.

28. The anode of claim 27, wherein the conductive thin film base anode is disposed on a substrate of a different material.

29. The anode of claim 25, wherein the conductive base anode is a bulk single crystal or a polycrystalline material.

30. The anode of claim 25, wherein the conductive base anode is made of a material selected from the group consisting of: Si, Ge, GaAs, GaP, InP, AlP, CdS, CdSe, and a combination thereof.

31. The anode of claim 25, wherein the conductive base anode is made of a material selected from the group consisting of: Ti, Al, TiN, Ir, Pd, Pt, Ni, Ru, Ta, oxides of Ir, Pd, Pt, Ni, metal silicides, metal germanides, and a combination thereof.

32. The anode of claim 25, wherein the conductive base anode has a porous structure.

33. The anode of claim 25, wherein the conductive base anode has pore channels having a length:diameter aspect ratio of about 2:1 to 20000:1.

34. The anode of claim 25, wherein the conductive base anode has a layer of metallic conducting or doped semiconducting nanowires, wherein the corrosion-inhibiting barrier layer is disposed on the nanowires.

35. The anode of claim 34, wherein the catalyst layer is conformally coated on the nanowires.

36. The anode of claim 34, wherein the layer of nanowires has an areal density of about 0.1 to 5000 wires per μm$^2$.

37. The anode of claim 35, wherein the nanowire has a diameter of about 10 nm to 1 μm and a height (length) of about 100 nm to 100 μm.

38. The anode of claim 34, wherein the layer of conductive nanowires is made of the same material as the conductive substrate.

39. The anode of claim 34, wherein the layer of conductive nanowires is made of a different material as the conductive substrate.

40. A method of producing molecular $O_2$ comprising:
exposing water to an anode, wherein the anode includes:
   a catalyst layer, a corrosion-inhibiting barrier layer, and a conductive base anode, wherein the oxidation-resistant barrier layer is disposed on the conductive base anode and the catalyst layer is disposed on the corrosion-inhibiting barrier layer, wherein the corrosion-inhibiting barrier layer is disposed between the catalyst layer and the conductive base anode, wherein the corrosion-inhibiting barrier layer is a pin-hole-free layer, wherein the interfacial areal resistance of the corrosion-resistant barrier layer is less than 10 ohms cm$^2$, and wherein the corrosion-inhibiting barrier layer is less than 10 nm thick,
oxidizing the water at the catalyst layer surface; and
forming molecular $O_2$.

41. A method of producing molecular $Cl_2$ comprising:
exposing chloride ions in an electrochemical solution to an anode, wherein the anode includes:
   a catalyst layer, a corrosion-inhibiting barrier layer, and a conductive base anode, wherein the oxidation-resistant barrier layer is disposed on the conductive base anode and the catalyst layer is disposed on the corrosion-inhibiting barrier layer, wherein the corrosion-inhibiting barrier layer is disposed between the catalyst layer and the conductive base anode, wherein the corrosion-inhibiting barrier layer is a pin-hole-free layer, wherein the interfacial areal resistance of the corrosion-resistant barrier layer is less than 10 ohms cm$^2$, and wherein the corrosion-inhibiting barrier layer is less than 10 nm thick,
oxidizing the chloride ions at the catalyst layer surface; and
forming molecular $Cl_2$.

42. A method comprising:
exposing the compounds selected from the group consisting of: an olefin, an aromatic or alkylated aromatic organic feedstocks in an electrochemical solution, to an anode, wherein the anode includes:
   a catalyst layer, a corrosion-inhibiting barrier layer, and a conductive base anode, wherein the oxidation-resistant barrier layer is disposed on the conductive base anode and the catalyst layer is disposed on the corrosion-inhibiting barrier layer, wherein the corrosion-inhibiting barrier layer is disposed between the catalyst layer and the conductive base anode, wherein the corrosion-inhibiting barrier layer is a pin-hole-free layer, and wherein the interfacial areal resistance of the corrosion-resistant barrier layer is less than 10 ohms cm$^2$,
oxidizing the compounds selected from the group consisting of: an olefin, an aromatic or alkylated aromatic organic feedstocks, at the catalyst layer surface; and
forming oxidized organic reaction products.

43. A method comprising:
exposing a compounds to an anode, wherein the anode includes:
   a catalyst layer, a corrosion-inhibiting barrier layer, and a conductive base anode, wherein the oxidation-resistant barrier layer is disposed on the conductive base anode and the catalyst layer is disposed on the corrosion-inhibiting barrier layer, wherein the corrosion-inhibiting barrier layer is disposed between the catalyst layer and the conductive base anode, wherein the corrosion-inhibiting barrier layer is a pin-hole-free layer, wherein the interfacial areal resistance of the corrosion-resistant barrier layer is less than 10 ohms cm$^2$, and wherein the corrosion-inhibiting barrier layer is less than 10 nm thick,
oxidizing the compounds at the catalyst layer surface;
forming oxidized compounds; and
determining the identity of the compounds or the quantity of the compounds.

* * * * *